(12) United States Patent
Dai et al.

(10) Patent No.: US 10,871,442 B2
(45) Date of Patent: Dec. 22, 2020

(54) PROTECTIVE STRUCTURE OF OIL SMOKE SENSOR

(71) Applicant: Ningbo Fotile Kitchen Ware Co., Ltd., Ningbo (CN)

(72) Inventors: Jiusong Dai, Ningbo (CN); Qinlong Xu, Ningbo (CN); Zhongqun Mao, Ningbo (CN); Yongding Zhu, Ningbo (CN); Ge Liu, Ningbo (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 0 days.

(21) Appl. No.: 16/097,711

(22) PCT Filed: Mar. 2, 2017

(86) PCT No.: PCT/CN2017/000206
§ 371 (c)(1),
(2) Date: Oct. 30, 2018

(87) PCT Pub. No.: WO2017/211075
PCT Pub. Date: Dec. 14, 2017

(65) Prior Publication Data
US 2019/0162653 A1    May 30, 2019

(30) Foreign Application Priority Data
Jun. 7, 2016 (CN) .......................... 2016 1 0398643

(51) Int. Cl.
*G01N 21/15* (2006.01)
*G01N 15/02* (2006.01)
*G01N 15/06* (2006.01)

(52) U.S. Cl.
CPC ......... *G01N 21/15* (2013.01); *G01N 15/0205* (2013.01); *G01N 15/06* (2013.01);
(Continued)

(58) Field of Classification Search
CPC .......... G01N 21/15; G01N 2201/0644; G01N 2201/081; G01N 15/0205; G01N 15/06;
(Continued)

(56) References Cited

U.S. PATENT DOCUMENTS

| 4,897,634 A | * | 1/1990 | Sawa | G08B 17/107 340/630 |
| 5,399,864 A | * | 3/1995 | Igarashi | G08B 17/113 250/381 |

(Continued)

FOREIGN PATENT DOCUMENTS

WO    WO-2016028996 A1 *  2/2016   ......... G01N 15/1404

*Primary Examiner* — Randy W Gibson
*Assistant Examiner* — Gedeon M Kidanu
(74) *Attorney, Agent, or Firm* — Wang Law Firm, Inc.

(57) ABSTRACT

A protection device for an oil-smoke sensor comprises a protection housing (1) having a first end, a second end, and an inner chamber (2); the first end having a first opening (3) for receiving a probe (5) of the oil-smoke sensor and in communication with the inner chamber (2); a second opening (4) is disposed on the second end which is opposite to the first opening (3) and in communication with the inner chamber (2). Because the probe (5) is sealing mounted in the first opening (3), the probe (5) will not be directly exposed in oil-smoke flow. When in use, the protective device is mounted in a manner that the axial direction of the protective device is vertical to the oil-smoke flow direction. Therefore, the inner chamber of the protection housing has a pressure with respect to the oil-smoke flow that tangentially flows at a high speed, and the oil-smoke can only be diffused into the protection housing, thus, the probe is much less likely to be contaminated; and the protection device has a good effect in preventing dust and oil-smoke pollution.

9 Claims, 2 Drawing Sheets

(52) U.S. Cl.
CPC . *G01N 15/0625* (2013.01); *G01N 2201/0644* (2013.01); *G01N 2201/0813* (2013.01)

(58) Field of Classification Search
CPC ........... G01N 15/0625; G01N 15/1404; G01N 15/1459; G01N 21/53; G01N 2201/062
See application file for complete search history.

(56) References Cited

U.S. PATENT DOCUMENTS

| | | | | |
|---|---|---|---|---|
| 6,057,775 | A * | 5/2000 | Sakurai | G08B 17/113 |
| | | | | 340/629 |
| 9,360,411 | B2 * | 6/2016 | Woolard | G01M 3/04 |
| 9,915,600 | B2 * | 3/2018 | Walls | G01N 15/1436 |
| 10,054,542 | B2 * | 8/2018 | Iguchi | G08B 17/107 |
| 2011/0126610 | A1 * | 6/2011 | Sekiya | G01N 27/4077 |
| | | | | 73/25.05 |
| 2014/0161559 | A1 * | 6/2014 | Kim | F16B 37/14 |
| | | | | 411/373 |
| 2017/0268980 | A1 * | 9/2017 | Clayton | C12Q 3/00 |
| 2018/0056228 | A1 * | 3/2018 | Kelly | G01N 15/02 |

* cited by examiner

PROTECTIVE STRUCTURE OF OIL SMOKE SENSOR

RELATED APPLICATIONS

This application is a national phase entrance of and claims benefit to PCT Application for a real-time fume concentration monitoring system and a range hood using the same, PCT/CN2017/000206, filed on Mar. 2, 2017, which claims benefit to Chinese Patent Applications 201610398643.5, filed on Jun. 7, 2016. The specifications of both applications are incorporated here by this reference.

FIELD OF THE INVENTION

The invention relates to the technical field of oil-smoke detection, in particular to a protection device for an oil-smoke sensor.

DESCRIPTION OF THE PRIOR ART

Photoelectric sensors use photoelectric elements as detection elements and operate in such a manner that changes of measured substances (such as oil-smoke concentration) are converted into changes of optical signals, and then the optical signals are further converted into electric signals by the photoelectric elements. The photoelectric sensors are typically composed of a light source, an optical path and a photoelectric element. As photoelectric detection methods have the advantages of being high in precision, quick in response and free of contact and can detect various parameters and sensors are simple in mechanism and has flexible and various forms, the photoelectric sensors are widely applied to detection and control.

In specific application scenes, components of the photoelectric sensors may be contaminated, which will result in sensitivity reduction and even failures. In certain scenes, the requirements for the collimation of light paths and the capacity to resist natural light interference of receivers are high.

A Chinese Patent CN1900809A (Application No. 200510042977.0) discloses an airflow-isolation camera lens dust-proof and dirt-proof protector, which is equipped with a clean compressed air source and a flow-adjustable conical ring-shaped airflow generator and can protect lenses by blocking dust with airflow. A Chinese Patent CN2837833Y (Application No. 200520132940.2) adopts a similar method by protecting photoelectric oil-smoke concentration measurement devices with an air curtain formed by high-pressure clean airflow, and thus, optical elements are protected against contamination.

The above-mentioned protection device all have the following drawbacks; an additional clean air source is needed, clean air is difficult to prepared, and an additional power source is required to guide the clean air into the devices.

SUMMARY OF THE INVENTION

A technical problem to be solved by the present invention is, in view of the prior art, to provide a protection device, which is simple in device, low in cost and good in oil stain resistance, for an oil-smoke sensor.

To solve the above technical problem, the protection device for an oil-smoke sensor comprises:

a protection housing having a first end, a second end, and an inner chamber;

the first end having a first opening for receiving a probe of the oil-smoke sensor and in communication with the inner chamber;

a second opening is disposed on the second end and in communication with the inner chamber.

Preferably, the protection housing has a cylindrical shape, and the inner chamber in the protection housing also has a cylindrical shape.

As an improvement, an inner diameter of the inner chamber varies along a length of the inner chamber.

As an improvement, the inner diameter of the inner chamber in communication with the first opening and the second opening is sequentially decreased and increased N times, wherein N is a natural number equal to or greater than 1. By decreasing and increasing the inner diameter of the inner chamber, a radial diffusion thrust is applied to oil-smoke when the oil-smoke enters the inner chamber from the second opening, and most of the oil-smoke entering the tubular inner chamber is diluted in this section and adheres to the inner wall of the tubular inner chamber; and when the inner diameter of the inner chamber is decreased, another part of the oil-smoke is blocked by the wall in the radial direction. After this process is repeated N times, it is much less likely for oil-smoke to diffuse into the inner chamber to reach the sensor probe.

Preferably, N pairs of opposite baffles are disposed on the inner wall of the inner chamber in communication with the first opening and the second opening, and a gap is reserved between the baffles in each pair, N is a natural number equal to or greater than 1. By adoption of this mechanism, non-collimating light emitted by a transmitting probe of an oil-smoke sensor can be eliminated through N times of internal reflection, thus, ensuring the collimation of emergent light. As for a receiving probe of a sensor, the influences of natural light and environmental stray light on received signals can be greatly reduced.

Preferably, when N is greater than or equal to 2, the gaps between every two adjacent pairs of baffles are different.

Preferably, the center of the gap between each of the N pairs of baffles is located on the same straight line with the centers of the first opening and the second opening.

Preferably, N baffles are disposed in the inner chamber communicated with the first opening and the second opening, and each baffle is provided with a through hole, wherein N is a natural number greater than or equal to 1.

Preferably, when N is greater than or equal to 2, the through holes in every two adjacent baffles have different diameters.

Preferably, central points of the through holes in the N baffles are located on the same straight line with central points of the first opening and the second opening.

Preferably, the tubular wall of the protection housing has a variable thickness, so that the inner chamber communicated with the first opening and the second opening has a variable inner diameter.

Compared with the prior art, the present invention has the following advantages: an inner chamber communicated with the first opening and the second opening is formed in the protection housing, then the probe of a photoelectric oil-smoke sensor is inserted into the first opening so as to be prevented from being directly exposed in an oil-smoke flow, oil-smoke can only be diffused into the protection housing, and thus, the probe is much less likely to be contaminated; and the protection device has a good effect in preventing dust and oil-smoke pollution.

DETAILED DESCRIPTION OF THE PREFERRED EMBODIMENT

To enable a further understanding of the present invention content of the invention herein, refer to the detailed description of the invention and the accompanying drawings below:

Embodiment 1

Figure 1:
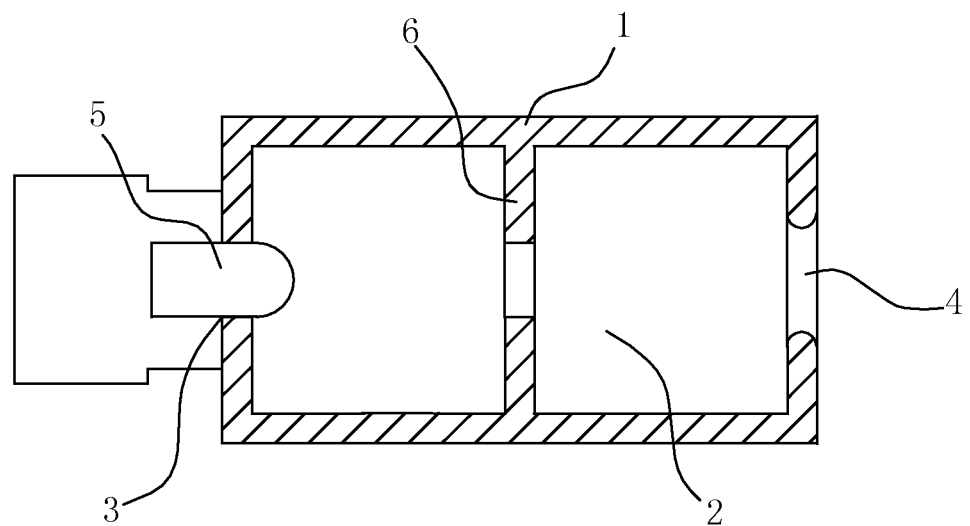
FIG. 1 is a sectional view of a protection device for an oil-smoke sensor according to Embodiment 1 of the present invention.

FIG. 1 shows Embodiment 1 of the protection device for an oil-smoke sensor of the present invention. As shown in FIG. 1, the protection device comprises a tubular protection housing 1 which has a tubular inner chamber 2 inside the protection housing 1, a first end and a second end. The first end of the protection housing 1 has a first opening 3 in communication with the tubular inner chamber 2, and a second opening 4 opposite to the first opening 3 is disposed on the second end of the protection housing 1 and in communication with the inner chamber 2. A probe 5 of the photoelectric oil-smoke sensor can be inserted into the first opening 3 in a sealed manner.

A baffle 6 is disposed in the middle of the tubular inner chamber 2 and is provided with a through hole. A central point of the through hole in the baffle 6 is located on the same straight line with central points of the first opening 3 and the second opening 4.

According to this device, the deep inner chamber is designed to prevent the probe 5 of the photoelectric oil-smoke sensor from being directly exposed in an oil-smoke flow; and the end, where the probe 5 is installed, is sealed, so that a positive pressure is formed in the inner chamber of the tubular protection housing 1 with respect to the oil-smoke flow tangentially flowing at a high speed, oil-smoke can only be naturally diffused into the tubular inner chamber, and thus, the probe is less likely to be contaminated.

The design of the baffle 6 changes the inner diameter of the tubular inner chamber, so that when oil-smoke enters the inner chamber from the second opening 4, a radial diffusion thrust is applied to the oil-smoke, and thus, most of the oil-smoke entering the tubular inner chamber is diluted in this section and adheres to the inner wall of the tubular inner chamber. As the inner chamber is blocked by the baffle 6, the oil-smoke further permeates into the inner chamber via the through hole in the baffle 6, at this moment, another part of the oil-smoke is blocked by the wall of the baffle 6, and thus, it is much less likely for the oil-smoke diffused into the inner chamber to reach the sensor probe 5.

Through this device, non-collimating light emitted by a transmitting probe 5 can be reflected and eliminated when passing through the interior of the baffle 6, thus, ensuring the collimation of emergent light. As for a receiving probe 5, the influences of natural light and environmental stray light on received signals can be greatly reduced.

Embodiment 2

Figure 2:
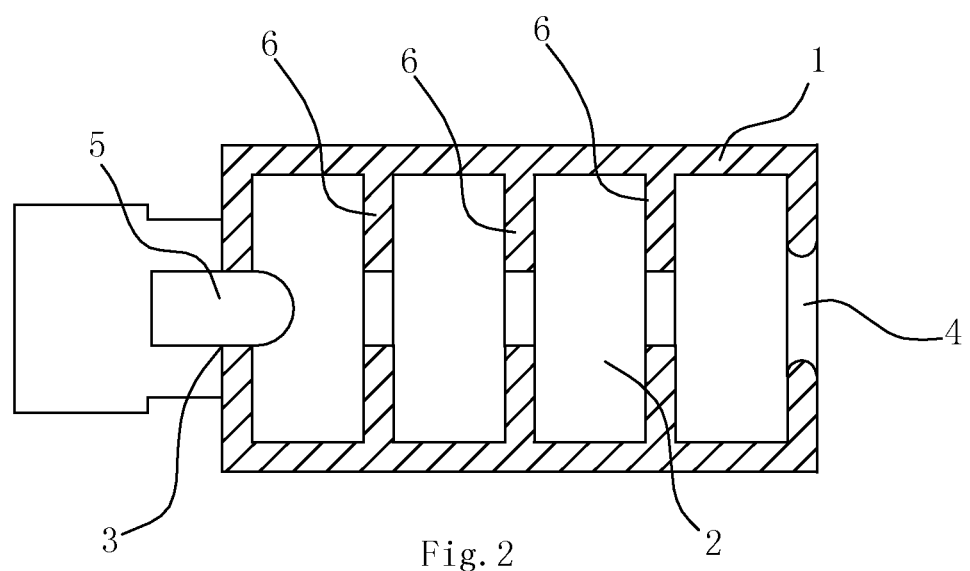
FIG. 2 is a sectional view of the protection device for an oil-smoke sensor according to Embodiment 2 of the present invention.

FIG. 2 shows Embodiment 2 of the protection device for an oil-smoke sensor of the present invention. This embodiment differs from embodiment 1 in the following features: a plurality of baffles 6 are disposed in the tubular inner chamber in a spaced manner, and in this embodiment, the number of the baffles 6 is three; and through holes formed in every two adjacent baffles 6 may have identical diameters or different diameters, and in this embodiment, the through holes have identical diameters, as shown in FIG. 2. Through the multiple diameter-variable labyrinth design, the inner diameter of the tubular inner chamber is increased and decreased repeatedly. Every time the inner diameter of the tubular inner chamber is increased, a radial diffusion thrust is applied to oil-smoke, so that most of the oil-smoke entering the tubular inner chamber is diluted in the corresponding section and adheres to the inner wall of the tubular inner chamber; every time the inner diameter of the tubular inner chamber is decreased, another part of the oil-smoke is blocked by the wall of the corresponding baffle; and this process is performed repeatedly to make the oil-smoke entering the tubular inner chamber have a concentration gradient in the radial direction, and thus, it is much less likely for the oil-smoke diffused into the tubular inner chamber to reach the sensor probe. In addition, through the variable-diameter design of the tubular inner chamber, an optical labyrinth can be formed in the tubular inner chamber to eliminate light, with a large divergence angle, emitted by a transmitting probe, thus, ensuring the collimation of emergent light. As for a receiving probe, disturbance from natural light and environmental light can be effectively reduced.

Embodiment 3

Figure 3:
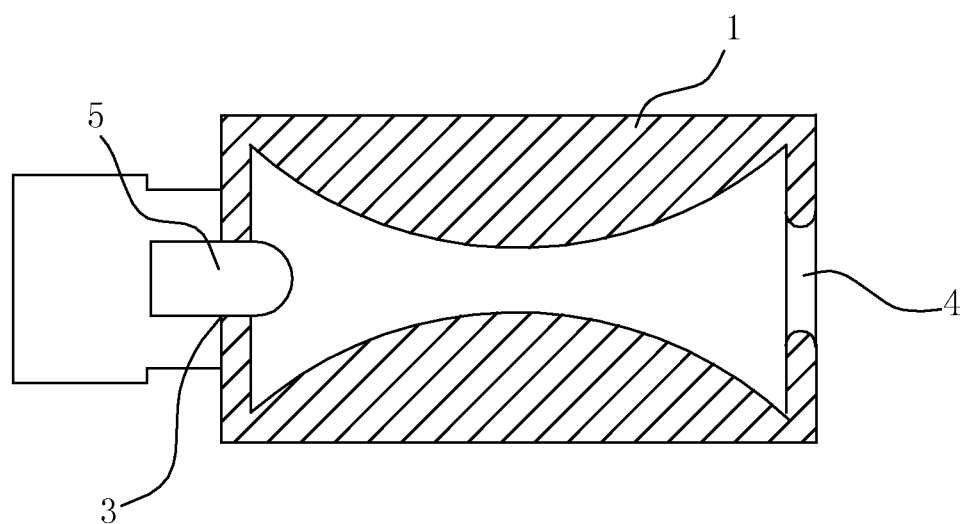
FIG. 3 is a sectional view of the protection device for an oil-smoke sensor according to Embodiment 3 of the present invention.

FIG. 3 shows Embodiment 3 of the protection mechanism for an oil-smoke sensor of the present invention. As shown in FIG. 3, this embodiment differs from embodiment 1 in that, the tubular wall of the tubular protection cover has a thickness gradually becoming smaller from the middle to two sides, and thus, the tubular cavity has a variable inner diameter.

Embodiment 4

Figure 4:
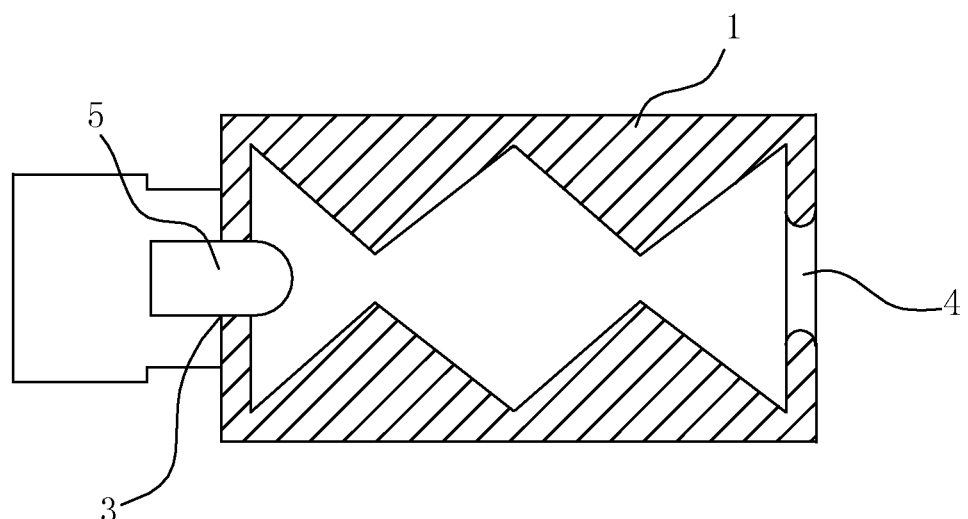
FIG. 4 is a sectional view of the protection device for an oil-smoke sensor according to Embodiment 4 of the present invention.

FIG. 4 shows Embodiment 4 of the protection device for an oil-smoke sensor of the present invention. As shown in FIG. 4, this embodiment differs from embodiment 3 in that, the tubular wall of the tubular protection housing changes repeatedly, and thus, the inner diameter of the tubular inner chamber changes repeatedly.

The invention claimed is:

1. A protection device for an oil-smoke sensor comprising:
   a protection housing having a first end, a second end, and an inner chamber;
   the first end having a first opening for receiving a probe of the oil-smoke sensor and in communication with the inner chamber;
   a second opening is disposed on the second end and in communication with the inner chamber;
   wherein an inner physical diameter of the inner chamber varies along a length of the inner chamber;

at least one pair of opposite baffles are disposed on the inner wall of the inner chamber in communication with the first opening and the second opening, wherein a through-hole is defined on each of the at least one pair of opposite baffles, and the through-holes are aligned;

wherein when at least two pairs of opposite baffles are disposed on the inner wall of the inner chamber, the through-holes formed between every two adjacent pairs of baffles have different diameters.

2. The protection device of claim 1, wherein the protection housing has a cylindrical shape, and the inner chamber in the protection housing also has a cylindrical shape.

3. The protection device of claim 1, wherein the inner physical diameter of the inner chamber in communication with the first opening and the second opening is sequentially decreased and increased at least once.

4. The protection device of claim 1, wherein the center of the through-holes between each of the at least one pair of baffles is located on the same straight line with the centers of the first opening and the second opening.

5. The protection device of claim 1, wherein the tubular wall of the protection housing has a variable thickness, so that the inner chamber communicated with the first opening and the second opening has a variable inner diameter.

6. The protection device of claim 1, wherein the inner chamber is physically separated into at least a first inner chamber and a second inner chamber, the first inner chamber is separated by a baffle from the second inner chamber, oil-smoke enters through the second opening into the first inner chamber and moves toward the second inner chamber through an opening on the baffle.

7. The protection device of claim 1, wherein the physical diameter of the inner chambers diminishes from the second end toward a center of the inner chamber before increases toward the first end.

8. A protection device for an oil-smoke sensor comprising:
 a protection housing having a first end, a second end, and an inner chamber;
 the first end having a first opening for receiving a probe of the oil-smoke sensor and in communication with the inner chamber;
 a second opening is disposed on the second end and in communication with the inner chamber;
 wherein an inner physical diameter of the inner chamber varies along a length of the inner chamber;
 wherein at least one baffle is disposed in the inner chamber communicated with the first opening and the second opening, and each baffle is provided with a through hole;
 wherein when at least two baffles are disposed in the inner chamber, the through holes in every two adjacent baffles have different diameters.

9. The protection device of claim 8, wherein central points of the through holes in the baffles are located on the same straight line with central points of the first opening and the second opening.

* * * * *